(12) United States Patent
Brunsting et al.

(10) Patent No.: US 6,256,446 B1
(45) Date of Patent: Jul. 3, 2001

(54) VARIABLE OPTICAL ATTENUATOR HAVING A LINEAR RESPONSE

(75) Inventors: Albert Brunsting, Naperville; Eric Walter, Westchester; Thomas Clifford Olson, Naperville, all of IL (US)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 09/294,320

(22) Filed: Apr. 20, 1999

(51) Int. Cl.⁷ .................................................... G02B 6/00
(52) U.S. Cl. ............................................. 385/140; 385/73
(58) Field of Search ............................... 385/140, 60, 73, 385/72; 350/96, 21

(56) References Cited

U.S. PATENT DOCUMENTS

| | | | |
|---|---|---|---|
| 4,145,110 | 3/1979 | Szentesi | 350/96.15 |
| 4,878,730 | 11/1989 | Wall | 350/96.21 |
| 5,050,956 | 9/1991 | Carpenter et al. | 385/140 |
| 5,066,094 | 11/1991 | Takahashi | 385/73 |
| 5,187,768 | 2/1993 | Ott et al. | 385/140 |
| 5,734,778 | 3/1998 | Loughlin et al. | 385/140 |
| 5,781,341 * | 7/1998 | Lee | 359/578 |

OTHER PUBLICATIONS

Jones, *Ingenious Mechanisms For Designers And Inventors*, vol. II, 1936, pp. 46–49, New York, New York.
Horton, *Ingenious Mechanisms For Designers And Inventors*, vol. III, 1951, pp. 29–33, New York, New York.

* cited by examiner

*Primary Examiner*—Cassandra Spyrou
*Assistant Examiner*—Nasreen Parvin
(74) *Attorney, Agent, or Firm*—Blank Rome Comisky & McCauley, LLP

(57) ABSTRACT

A variable attenuator includes a rotatable actuator and cam arrangement arranged to vary a length of an air gap between ends of fibers in a transmission line. The cam arrangement includes a cylindrically shaped cam member having an end surface cut to fit a curve representing normalized attenuation-to-gap-length data, the cam follower(s) being fitted in a sliding member that holds the end of the optical fiber and moves it relative to a fixed end of another fiber connector member. The cam surface includes multiple identical cam surface sections extending less than 180° around the cam to define movement of the cam follower(s) and the sliding member between a maximum position and a minimum position. The cam surface sections may be connected by ramps that permit a pair of cam followers to move from the maximum position to the minimum position and back in a continuous path that allows an actuator to be turned beyond the maximum and minimum positions and automatically reset without damage to any of the components of the attenuator.

15 Claims, 6 Drawing Sheets

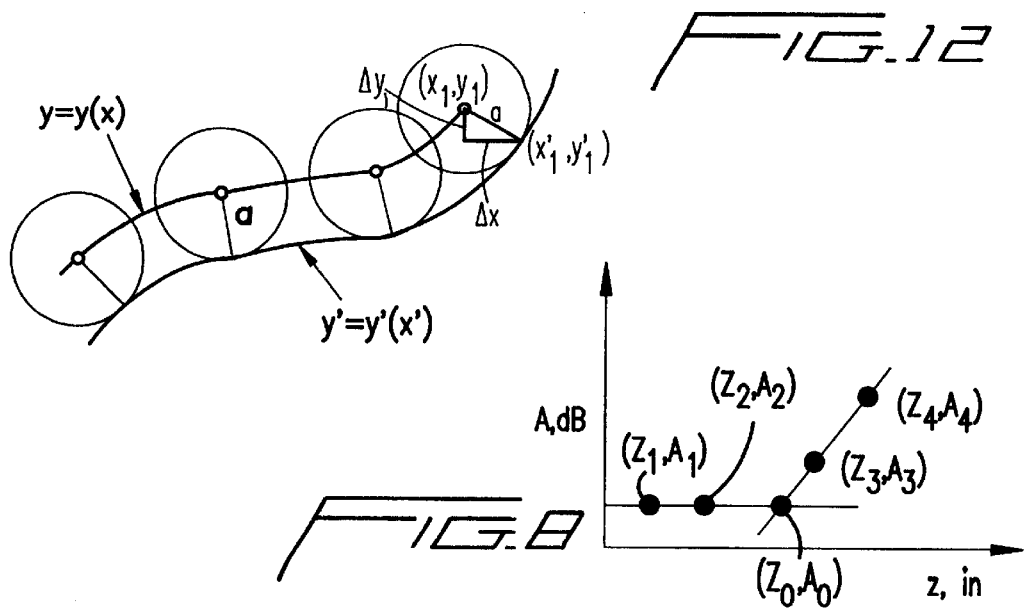
FIG. 12
FIG. 8
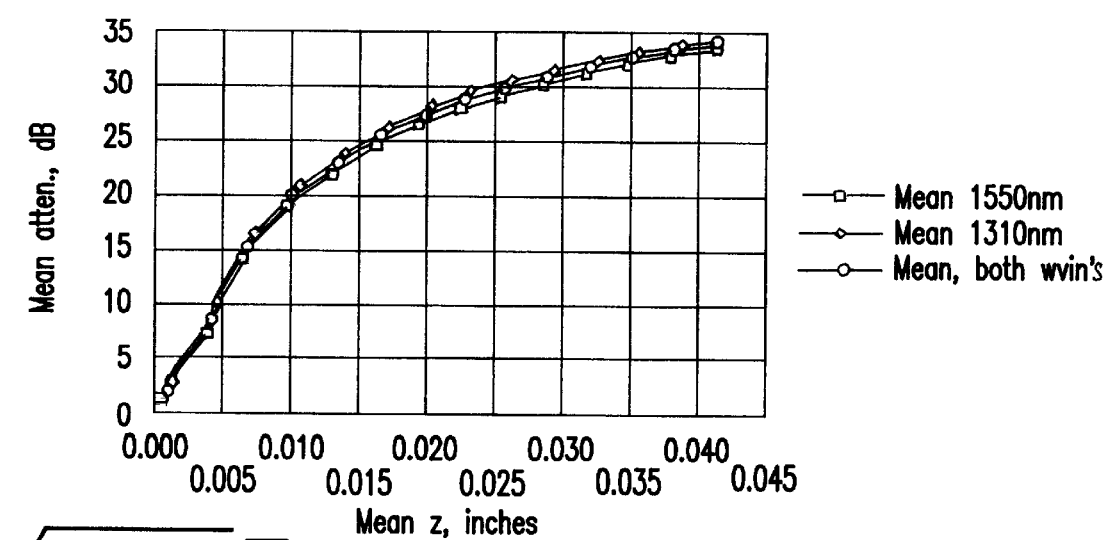
FIG. 9
FIG. 10

| theta degrees | drop inches | theta degrees | drop inches | theta degrees | drop inches | theta degrees | drop inches |
|---|---|---|---|---|---|---|---|
| 0 | 0.00000 | 40 | 0.00360 | 80 | 0.00818 | 120 | 0.01858 |
| 1 | 0.00013 | 41 | 0.00369 | 81 | 0.00833 | 121 | 0.01903 |
| 2 | 0.00014 | 42 | 0.00378 | 82 | 0.00850 | 122 | 0.01949 |
| 3 | 0.00018 | 43 | 0.00387 | 83 | 0.00866 | 123 | 0.01997 |
| 4 | 0.00022 | 44 | 0.00396 | 84 | 0.00883 | 124 | 0.02046 |
| 5 | 0.00027 | 45 | 0.00405 | 85 | 0.00900 | 125 | 0.02098 |
| 6 | 0.00033 | 46 | 0.00414 | 86 | 0.00917 | 126 | 0.02152 |
| 7 | 0.00039 | 47 | 0.00424 | 87 | 0.00935 | 127 | 0.02207 |
| 8 | 0.00046 | 48 | 0.00433 | 88 | 0.00953 | 128 | 0.02265 |
| 9 | 0.00054 | 49 | 0.00442 | 89 | 0.00972 | 129 | 0.02326 |
| 10 | 0.00063 | 50 | 0.00452 | 90 | 0.00991 | 130 | 0.02389 |
| 11 | 0.00073 | 51 | 0.00462 | 91 | 0.01010 | 131 | 0.02454 |
| 12 | 0.00083 | 52 | 0.00472 | 92 | 0.01030 | 132 | 0.02523 |
| 13 | 0.00094 | 53 | 0.00482 | 93 | 0.01050 | 133 | 0.02594 |
| 14 | 0.00105 | 54 | 0.00492 | 94 | 0.01071 | 134 | 0.02669 |
| 15 | 0.00117 | 55 | 0.00502 | 95 | 0.01092 | 135 | 0.02748 |
| 16 | 0.00128 | 56 | 0.00512 | 96 | 0.01114 | 136 | 0.02830 |
| 17 | 0.00140 | 57 | 0.00523 | 97 | 0.01136 | 137 | 0.02916 |
| 18 | 0.00152 | 58 | 0.00534 | 98 | 0.01159 | 138 | 0.03007 |
| 19 | 0.00163 | 59 | 0.00544 | 99 | 0.01182 | 139 | 0.03102 |
| 20 | 0.00174 | 60 | 0.00555 | 100 | 0.01206 | 140 | 0.03203 |
| 21 | 0.00185 | 61 | 0.00567 | 101 | 0.01231 | 141 | 0.03309 |
| 22 | 0.00196 | 62 | 0.00578 | 102 | 0.01256 | 142 | 0.03422 |
| 23 | 0.00207 | 63 | 0.00590 | 103 | 0.01282 | 143 | 0.03540 |
| 24 | 0.00217 | 64 | 0.00601 | 104 | 0.01309 | 144 | 0.03666 |
| 25 | 0.00227 | 65 | 0.00613 | 105 | 0.01336 | 145 | 0.03800 |
| 26 | 0.00236 | 66 | 0.00625 | 106 | 0.01364 | 146 | 0.03943 |
| 27 | 0.00246 | 67 | 0.00637 | 107 | 0.01393 | 147 | 0.04095 |
| 28 | 0.00255 | 68 | 0.00650 | 108 | 0.01422 | 148 | 0.04257 |
| 29 | 0.00264 | 69 | 0.00663 | 109 | 0.01453 | 149 | 0.04431 |
| 30 | 0.00273 | 70 | 0.00675 | 110 | 0.01484 | 150 | 0.04618 |
| 31 | 0.00282 | 71 | 0.00689 | 111 | 0.01517 | 151 | 0.04819 |
| 32 | 0.00291 | 72 | 0.00702 | 112 | 0.01550 | 152 | 0.05036 |
| 33 | 0.00299 | 73 | 0.00715 | 113 | 0.01584 | | |
| 34 | 0.00308 | 74 | 0.00729 | 114 | 0.01620 | | |
| 35 | 0.00317 | 75 | 0.00743 | 115 | 0.01656 | | |
| 36 | 0.00325 | 76 | 0.00758 | 116 | 0.01694 | | |
| 37 | 0.00334 | 77 | 0.00772 | 117 | 0.01733 | | |
| 38 | 0.00343 | 78 | 0.00787 | 118 | 0.01773 | | |
| 39 | 0.00351 | 79 | 0.00802 | 119 | 0.01815 | | |

VARIABLE OPTICAL ATTENUATOR HAVING A LINEAR RESPONSE

BACKGROUND OF THE INVENTION

1. Field of the Invention

This invention relates to a variable attenuator for fiber optic transmission cables, and in particular to a variable attenuator of the type in which attenuation is achieved by varying an air gap between ends of two optical fibers. A cam arrangement is included to achieve a linear response between turning of an actuator and attenuation of an optical signal transmitted through the gap between the fiber optic transmission cables.

2. Description of Related Art

Attenuators are used to regulate the strength of an optical signal in a fiber optic transmission system. It is desirable to maintain the strength of an optical signal within a certain range to avoid receiver saturation, to compensate for variable distances of various receivers from the source, or to compensate for aging or other changes in the system.

The present invention involves a variable attenuator that is in the form of a fiber optic coupler arranged such that a controllable air gap exists between the ends of the fibers in the transmission cables coupled by the coupler. By mechanically varying the air gap length, the amount of attenuation can be controlled. Examples of variable attenuators of this type are disclosed in U.S. Pat. Nos. 4,145,110 and 5,066,094. A similar arrangement, involving interception of the air gap by a screw rather than direct adjustment of the air gap length is disclosed in U.S. Pat. No. 5,734,778.

FIG. 1 illustrates one such conventional variable attenuator of the type in which the air gap length in varied by turning a screw, and which is available from Amphenol Corporation, Fiber Optics Products Division, Lisle, Ill. The variable attenuator couples two transmission cables 1,2, each of which is terminated in conventional fashion by: (1) stripping the respective cable jackets 3,4, and strength members 5,6 to expose fiber buffers 7,8; (2) further stripping portions of the fiber buffers 7,8 to expose the fibers and inserting the exposed fibers in alignment ferrules 9,10; (3) polishing ends of alignment ferrules 9,10 so that the ends of the exposed fibers are flush with the facing surfaces of the alignment ferrules; (4) capturing the alignment ferrule holding members 11,12 and bias springs 13,14 within externally threaded front portions 15,16 of rear bodies 17,18 by securing the front portions to internally threaded rear portions 19,20 of front bodies 21,22; (5) crimping exposed portions of strength members 7,8 between rear portions 23,24 of rear bodies 17,18 and crimp ferrules 25,26; and securing boots 27,28 to the rear bodies 17,18.

Front body 21 of the first transmission cable is arranged in conventional fashion to support a coupling nut 29, but slide body 22 of the second transmission cable termination has been modified to be cylindrical in shape and to include external threading for cooperation with an internally threaded thumb wheel 30. Thumb wheel 30 includes a collar 31 that is captured between a front housing 32 and a rear housing 33 which together form the attenuator housing upon threading of rear housing 33 onto an externally threaded extension 34 of front housing 32, and as a result thumb wheel 30 can rotate relative to front housing 32 but cannot move axially. On the other hand, slide body 22 is free to slide axially within front housing 32, causing alignment ferrule 10 to also move axially in response to rotation of thumb wheel 30. Rotation of slide body 22 is prevented by a dowel 35 extending inwardly from front housing 32 and slidably fitted in a slot in slide body 22, while an attenuation spring 36 captured between the front housing 32 and slide body 22 eliminates tolerances between the threading of the thumb wheel 30 and slide body 22.

Alignment of ferrules 9,10 is provided by an alignment sleeve 37 fitted in a holder 38, which in turn is captured between front body 32 and an adapter 39 upon threading of adapter 39 into the front housing. Extending from adapter 39 is a cylindrical coupling section 40 to which the coupling nut 29 is secured to thereby fix cable 1 relative to the housing. In order to vary the length of the air gap between the ends of ferrules 9,10, it is simply necessary to turn thumb wheel 30, causing corresponding axial movement of slide body 22 and ferrule 10 relative to the fixed position of ferrule 9 and front housing 32.

A problem with attenuators of the type illustrated in FIG. 1 is that the relationship between air gap length and attenuation is non-linear, making it difficult to predict the attenuation that will result for a given number of turns of the thumb wheel 30. For example, adjustment of the attenuation from 10 dB to 15 dB might require 1.3 turns of the wheel, while adjustment of the attenuations from 20 dB to 25 dB might require 0.8 turns of the thumb wheel. Adjustment of the attenuation would be much easier to achieve if each turn of the thumb wheel resulted in the same variation in attenuation, i.e., if the relationship between turns of the wheel and attenuation were linear, but such a linear relationship is not possible in conventional screw arrangements of the type illustrated in FIG. 1 due to the non-linear relationship between the air gap length and attenuation of the light signal across the air gap.

A second problem with attenuators of the type illustrated in FIG. 1 is that the thumb wheel or adjustment screw can easily be turned beyond the minimum and maximum attenuation points, causing damage to the attenuator.

The present invention solves these problems by replacing just five parts of the conventional variable attenuator mechanism illustrated in FIG. 1. The five parts are the slide body 22, thumb wheel 30, rear housing 33, a wave washer (not shown) which fits between the slide body 22 and front housing 32, and a Teflon™ washer (not shown) which fits between the thumb wheel 30 and rear housing 33. These five parts are replaced by a modified slide body, a cam body, a worm and worm gear mechanism, and a modified rear housing which cooperate to cause the air gap length to be adjusted in such a way that each turn of an actuator will result in a proportional change in the attenuation, as will be described below, thereby simplifying the adjustment procedure without an undue increase in complexity of the attenuator. The cam surface is arranged such that the position of the slide body will reset when the actuator is turned beyond the maximum or minimum positions, making it impossible to damage the attenuator by over-turning of the actuator.

SUMMARY OF THE INVENTION

It is accordingly an objective of the invention to provide a variable attenuator for fiber optic transmission cables that achieves a linear response between turning of an actuator and attenuation of a light signal across a air gap.

It is a further objective of the invention to provide a variable attenuator for fiber optic transmission cables in which attenuation is achieved by mechanically varying a air gap between ends of respective transmission cables in response to turning of an actuator, the relationship between air gap length and attenuation being non-linear, and yet in which the relationship between turning of the actuator and the resulting attenuation is linear.

It is a still further objective of the invention to provide a variable attenuator for fiber optic transmission cables in which a linear relationship is achieved between a mechanical input and the resulting attenuation, and yet which is easily assembled and which uses standard fiber optic transmission cable terminations.

It is yet another objective of the invention to provide a variable optical attenuator with a non-destructive feature which allows the input actuator to be turned beyond the maximum range of the attenuator without damaging the attenuator.

These objectives are achieved, in accordance with the principles of the invention, by providing a linear attenuator of the type in which a rotatable actuator is used to vary a length of the air gap between ends of fibers in a transmission line, but in which instead of directly driving the sliding mechanism that moves the fiber ends relative to each other, the rotatable actuator is used to turn a cam having a surface that causes the air gap length to change in non-linear fashion in response to turning of the actuator, and the attenuation to thus vary in a linear fashion.

In a preferred embodiment of the invention, the cam is a cylindrically shaped cam member having an end surface cut to fit a curve representing normalized attenuation-to-gap-length data, and the follower is fitted in a slide body that holds the end of the optical fiber and moves it relative to a fixed end of a second fiber connector member. The cam is turned by a screw drive that provides multiple turns of the screw for each rotation of the cam member, the screw being connected to the cam by a worm and a worm gear that mesh and turn the cam. A sliding body is arranged to transport an end of a cable terminated to a ferrule, rear body, and the slide body in the conventional manner described above in connection with FIG. 1, the slide body having an interior structure identical to that of the prior sliding front bodies. Two cam followers are arranged at ends of the slide body to face a cam surface at one end of the cam member, and a spring is arranged between the front housing and the sliding body to ensure positive engagement between the cam followers and the cam surface.

In an especially advantageous version of the preferred embodiment, the cam has two identical cam surfaces extending less than 180° around the cam and connected by ramps, the cam surfaces defining movement of the sliding member between a maximum and a minimum and the ramps permitting a pair of cam followers to move from a maximum position to a minimum position and back in a continuous path to thereby allow the actuator to be turned beyond the maximum and minimum positions and automatically reset without damage to any of the components of the attenuator.

Preferably, the housing is arranged so that the worm gear can easily be accessed by removing a worm gear plate at the rear of the rear housing, the worm can be accessed by shaft plates at opposite sides of the rear housing, and the front of the housing is arranged to receive a front housing and adapter corresponding to the front housing 32 and adapter 39 shown in FIG. 1, so that a second fiber optic transmission cable having a conventional termination and coupling nut can be coupled thereto and fixed in position relative to the movable fiber optic transmission cable, removal of the front housing and worm gear plate providing complete access to the sliding body and cam member.

BRIEF DESCRIPTION OF THE DRAWINGS

FIG. 3 is a cross-sectional rear view of the linear response attenuator arrangement illustrated in FIG. 2, without the transmission cables.

FIG. 4 shows the same cross-sectional side view as in FIG. 2, without the transmission cables.

FIG. 8 illustrates the manner in which the air gap and attenuation values are normalized to account for tolerances in the conventional attenuator used to generate the graph illustrated in FIG. 7C.

FIG. 9 is a graph of actual attenuation data taken at 1550 nm and 1310 nm.

FIG. 10 is a graph representing a curve fit to the mean of the attenuation data shown in FIG. 9.

FIG. 12 is an idealized schematic representation of the effect of cam follower shape on movement of the cam follower along the cam surface.

FIGS. 12 and 13 are, respectively, a side view of the cam surface portion of a preferred cam member and a projection of the circumference of the cam member illustrated in FIG. 12 onto a plane for the purpose of better showing the shape of the cam surface.

FIG. 14 is a projection of a cam surface corresponding to that of FIG. 13, but modified to include a non-destructive reset feature.

DETAILED DESCRIPTION OF THE PREFERRED EMBODIMENTS

Figure 1:
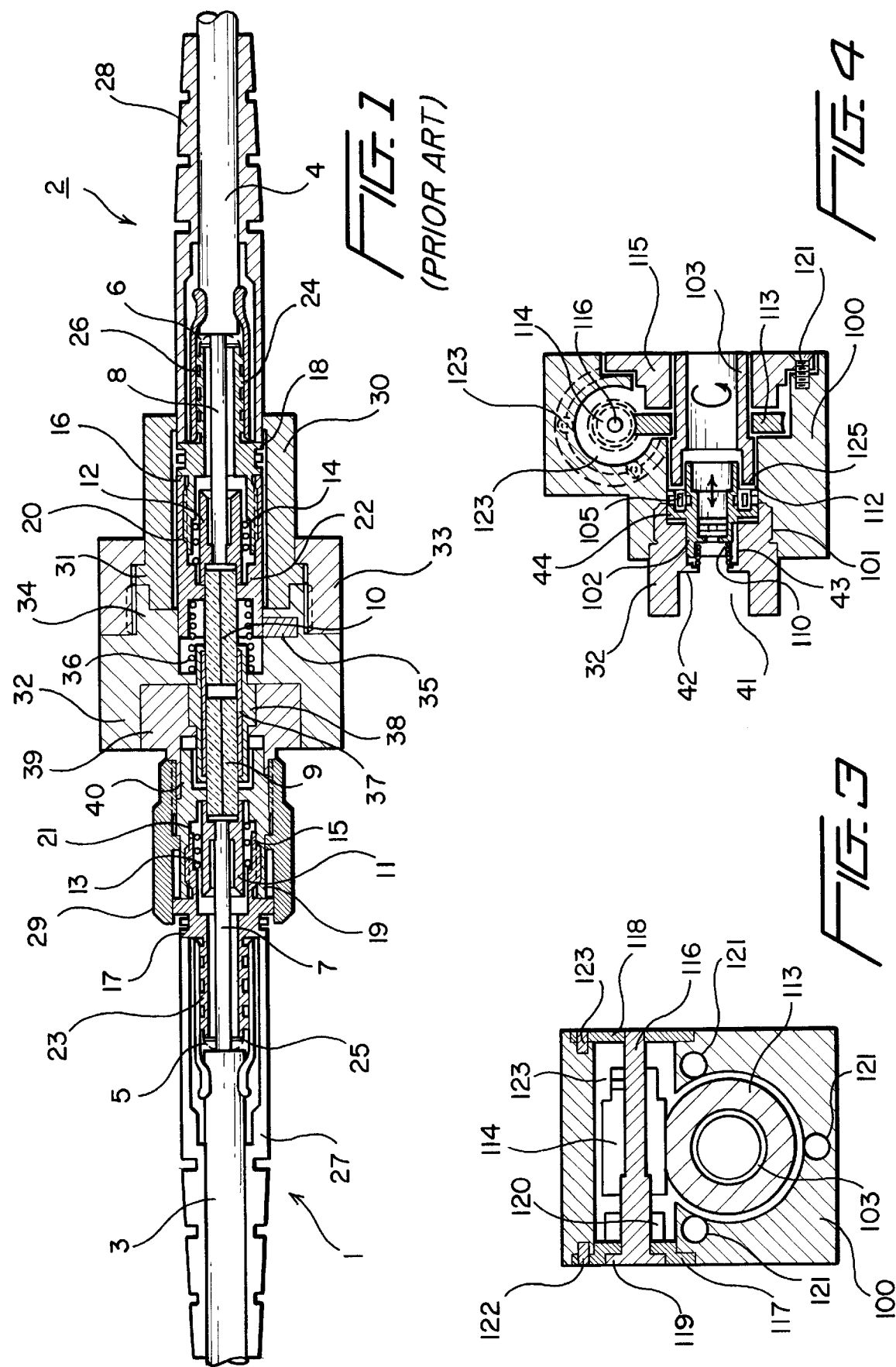
FIG. 1 is a cross-sectional side view of a conventional fiber optic transmission cable attenuator arrangement having a screw drive.
Figure 2:
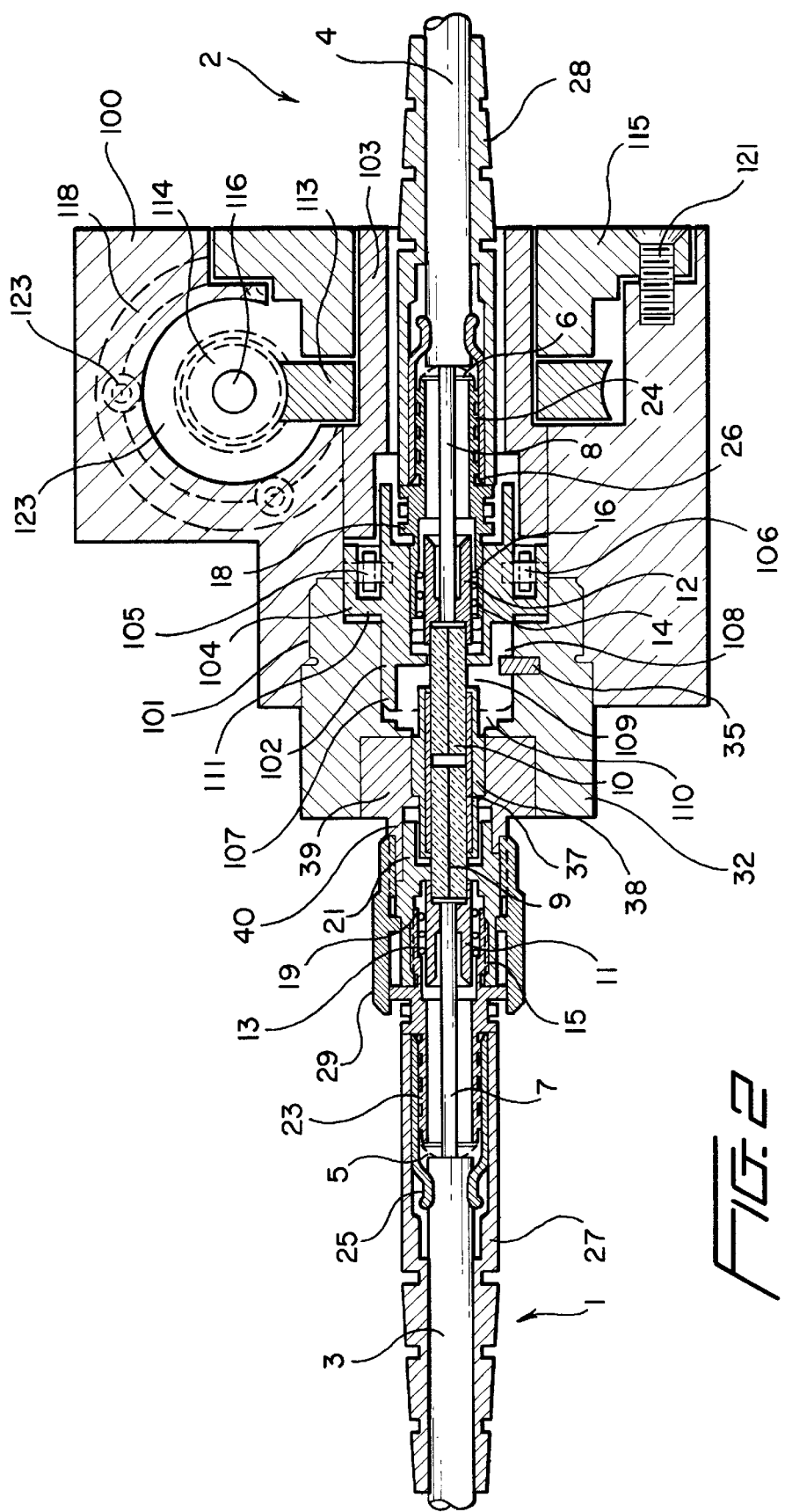
FIG. 2 is a cross-sectional side view of a linear-response fiber optic transmission cable attenuator arrangement constructed in accordance with the principles of a preferred embodiment of the invention.
Figures 5, 6:
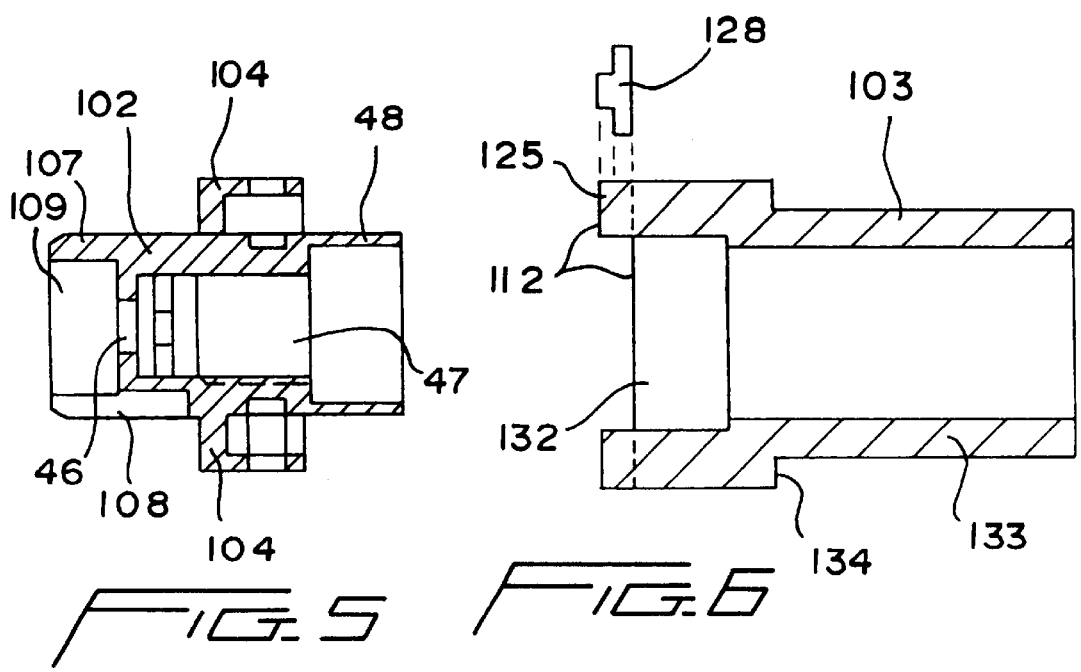
FIGS. 5 and 6 are respective cross-sectional side views of the slide body and cam member illustrated in FIGS. 2–4.

As illustrated in FIGS. 2–4, a linear variable attenuator constructed in accordance with the principles of a preferred embodiment of the invention includes a front housing 32 corresponding to front housing 32 illustrated in FIG. 1, and a rear housing 100 having a front opening 101 into which front housing 32 may be threaded. Because front housing 32 may be identical to front housing 32 of FIG. 1, transmission cable 1 may conveniently be terminated to the housing via the same adapter 39 illustrated in FIG. 1, adapter 39 extending into opening 41 to abut inwardly extending collar 42 of front housing 32, with coupling nut 29 being coupled to adapter 39 in exactly the same manner as described above in connection with FIG. 1.

Because the parts are interchangeable, the corresponding elements of the termination and coupling mechanism for the first fiber optic transmission cable 1 have been given the same reference numerals as corresponding parts in FIG. 1 and will not be further described herein. Similarly, the second fiber optic transmission cable 2 is terminated and coupled to the attenuator in the same manner as illustrated in FIG. 1 and therefore the corresponding elements of the second transmission cable termination have been given the same reference numerals as corresponding parts in FIG. 1 and will not be further described herein, with the exception of the slide body 102, which fits into central opening 43 and rear opening 44 of front housing 32, and has been modified to cooperate with various drive elements for causing the slide body to move with respect to the attenuator housing in non-linear fashion. It is noted that openings and a collar corresponding to openings 41, 43, and 44, and collar 42 illustrated in FIG. 4, are present in the front housing illustrated in FIG. 1 but not numbered therein.

Slide body 102 has an internal configuration identical to that of slide body 22 illustrated in FIG. 1 so as to accommodate the conventional fiber optic cable termination, including a central opening 46 for receiving alignment ferrule 10 and a communicating central opening 47 for receiving the front section 16 of rear body 18. However, the exterior of slide body 102 has been modified to enable it to cooperate with cam member 103 to move the second transmission cable 2 relative to the first transmission cable 1. Although the cable termination and coupling elements as well as front housing 32 are conveniently identical to those illustrated in FIG. 1, those skilled in the art will appreciate that the details of the cable termination and couplings form no part of the present invention, and that any of the illustrated termination and coupling elements may be modified so long as they can be moved in a manner which linearizes the output of the attenuator, as described below.

Extending from the outside surface of slide body 102 are two cam follower supports 104 arranged to support cam follower pins 105 and 106, which extend rearwardly in an axial direction relative to the cylinder axis of slide body 102 so as to float on the surface of the cam. An outer surface of cylindrical front section 107 of slide body 102 is received in opening 43 of the front housing 32 in such a manner that dowel 35 extends into slot 108 to prevent rotation of the slide body as it moves back and forth. Although not shown, a second dowel may be added to help prevent the slide body from rotating. In addition, those skilled in the art will appreciate that the cam surface should be made as smooth as possible to prevent imparting torque to the slide body, and dimensions and materials of the slide body, cam member, and any other parts may be adjusted accordingly to prevent torque on the slide body and consequent deformation. Lubrication, consistent with environmental specifications, may be added to the cam surface so that torque is further reduced.

An opening 109 in the slide body 102 receives an attenuator spring 110, which may be identical to the corresponding spring 36 illustrated in FIG. 1, and which biases the slide body in the direction of engaging the cam follower. Rear section 48 of slide body 102 fits into opening 132 in the cam member, while the front surface 111 of the cam follower supports faces a shoulder of the front housing to capture the slide body between the cam member 103 and the front housing 32, with both the slide body 102 and cam member 103 being fully accessible upon removal of the front body 32 from rear body 100.

Cam member 103 has attached to its end a cam piece 125, illustrated in FIGS. 12 and 13 and described in more detail below, which includes a cam surface 112 arranged to face and be engaged by the cam followers 105,106. A connector element 128 fits into slots 129 in the cam member 103 and cam piece 125 to secure the cam piece to the cam member.

Those skilled in the art will appreciate that the cam surface 112 could alternatively be cut directly into the cam member rather than being provided on a separate cam piece.

As indicated above, and described in further detail below, the basic principle involved in designing the cam piece 125 and cam surface 112 is to ensure that rotation of the cam member 103 causes a linear movement of the slide body 102 by an amount which is proportional to the angle of rotation or the number of turns of an actuator. In a conventional screw drive, the change in air gap length is proportional to the angle of rotation, but the resulting attenuation does not vary by a constant amount because attenuation is not proportional to the air gap length. The cam surface of the present invention is intended to compensate for the this non-linear relationship between air gap length and attenuation of light across the air gap.

Rotation of the cam member could be achieved by any suitable mechanism, including a direct drive or thumb screw mechanism, but the preferred embodiment of the invention utilizes a worm and worm gear mechanism in order to achieve a more compact and efficient mechanism that is easily assembled and disassembled. One example of such a worm and worm gear can be found in the W.M. Berg B2000 Master Catalog, p. B149 W48B29-D40 (worm gear) and W48S-2D (worm). It will nevertheless be appreciated by those skilled in the art that the present invention is not to be limited in any way to a particular drive mechanism for causing rotation of the cam member.

The worm drive of the embodiment illustrated in FIGS. 2–4 includes a worm gear 113 and worm 114. Considerations for selecting the worm and worm gear include the absence of significant backlash, a favorable drive ratio of, for example, 20-1, which gives an effective drive ration of 10-1 for a cam surface with two cam followers, and standardization so that off-the-shelf worm and worm drive gears of the type used in other smaller applications can be used.

As illustrated in FIGS. 2–4, worm gear 113 is fitted over rear section 133 of the cam gear and is held in place by a worm gear plate 115 which slips against the worm gear, the worm gear being sandwiched between the worm gear plate 115 and a shoulder 134 on the cam member to constrain the worm gear and cam body, thereby pressing the cam against the slide body 102. Attenuator spring 110 pushes the slide body back toward the worm gear plate while the central opening in the worm gear centers the cam body, which is also centered by the housing 100.

The worm 114 is mounted within an opening 123 on a shaft 116 supported by plates 117 and 118 at each end, the front end including a slotted shaft head 119 which can be turned by a screwdriver to rotate the worm. Shaft 116 is secured to the shaft head plate 117 by a collar 120 and plates 115, 117, and 118 are attached to the housing 100 by respective sets of screws 121, 122, and 123, not all of which are shown. There are many ways to support the shaft and worm. Those skilled in the art will appreciate that the slotted shaft head could be replaced by a thumb wheel or other actuator member to facilitate turning of the worm and worm gear, and that the shaft could also be turned by a motor to make possible automatic adjustment of the attenuation.

An advantage of the illustrated attenuator structure is that it can easily be assembled by terminating a cable to the slide body 102 in the manner described above, coupling a cable to the adapter 39 and securing the front housing 32 to the rear housing 100 (or securing the front housing to the rear housing and then coupling a cable to the adapter), inserting the slide body into the housing 100 from the rear, inserting the cam body 103 from the rear, fitting the worm gear 112 over the cam body 103, attaching worm gear plate 114 to the housing 100 using screws 120, attaching shaft 115 to the shaft head plate 116 and fitting the worm into opening 123, and securing plates 116 and 117 to the rear housing 110 using screws 122 and 123.

Figure 7A:
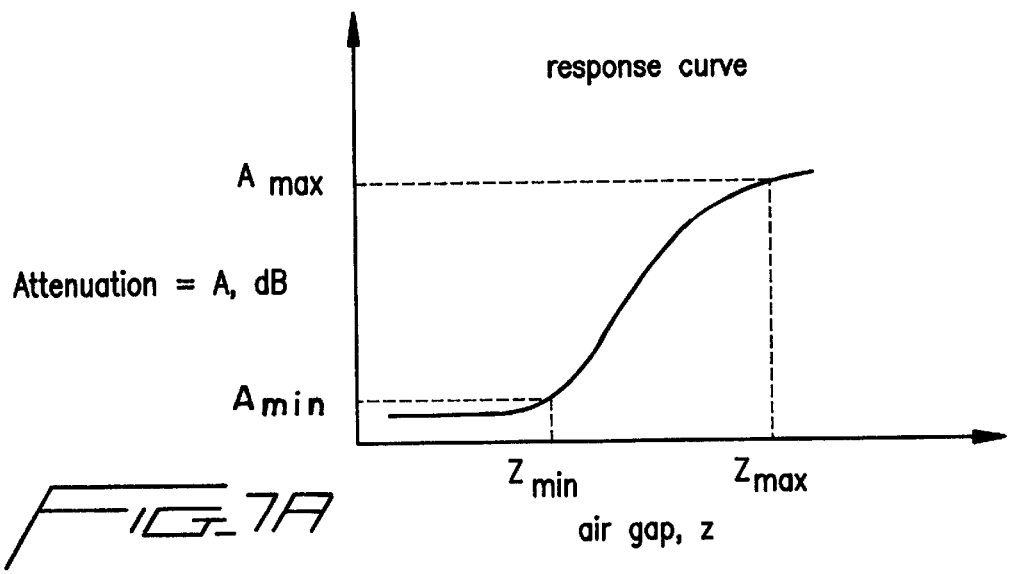
FIG. 7A is a graph illustrating the attenuation provided by the conventional attenuator of FIG. 1 as a function of the air gap length.

The manner in which the response curve of a variable attenuator is linearized is illustrated in FIGS. 7A–7C and 8–11. Initially, the response of a variable attenuator to air gap length must be measured using a conventional variable attenuator of, for example, the type illustrated in FIG. 1. FIG. 7A shows the change in attenuation as the length of the air gap is varied across the operating range of the attenuator.

Figure 7B:
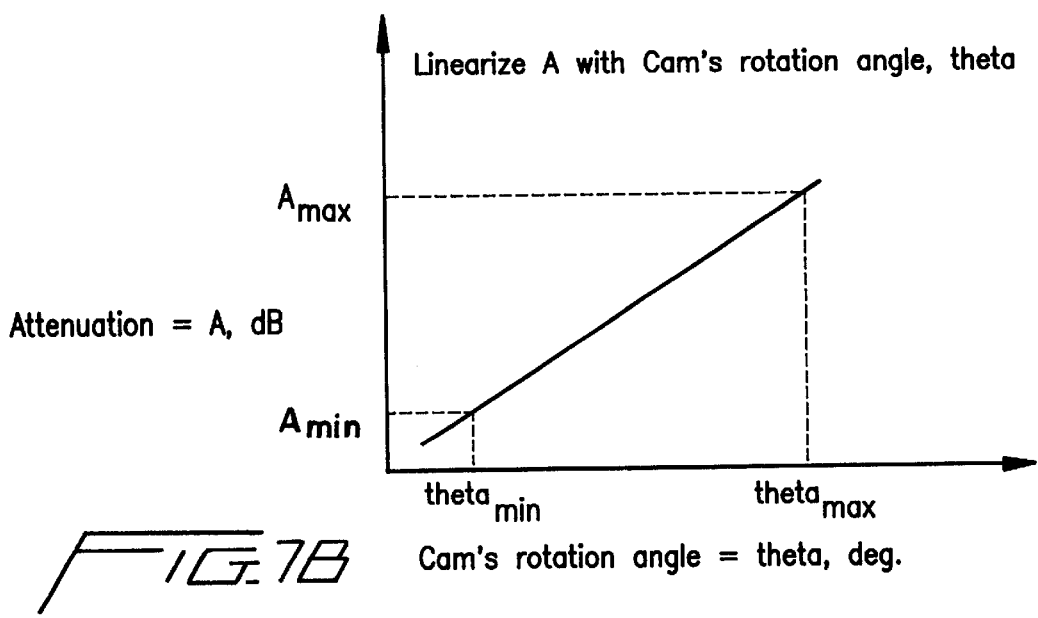
FIG. 7B is a graph illustrating the desired linear response between rotation of the cam member and the resulting attenuation.
Figure 7C:
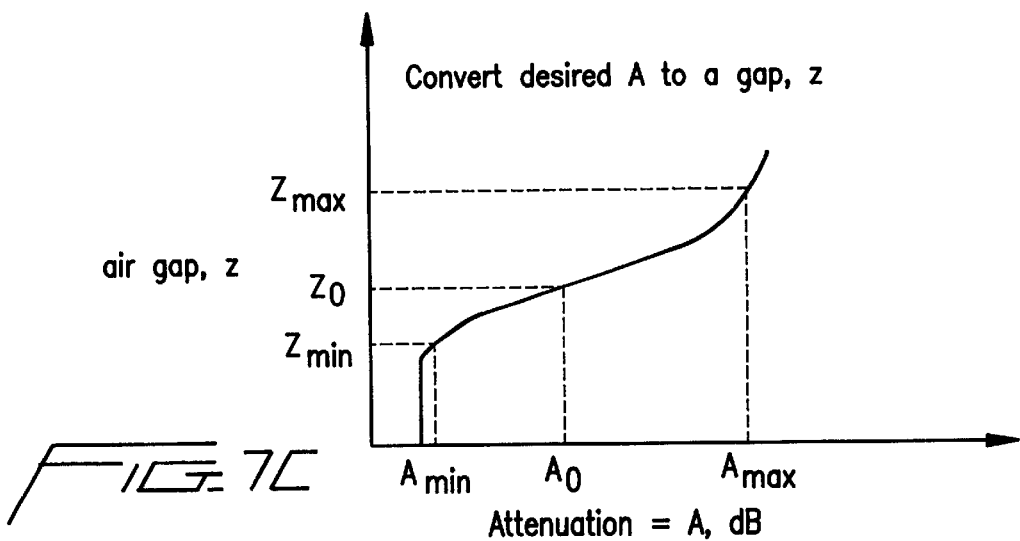
FIG. 7C is a graph of air gaps as a function of attenuation, which is used to determine the shape of the cam surface.

In order to linearize the response of the variable attenuator, the invention seeks to vary the air gap in non-linear fashion so that the attenuation becomes proportional to movement of the actuator, as illustrated in FIG. 7B. This is accomplished by plotting the air gap as a function of the attenuation, which can then be used to determine the amount by which the surface cam 112 must be cut to linearize the air gap. In the example shown in FIG. 7C, which is subject to the adjustments described below, the air gap is increased from a minimum, the air gap needs to be increased at a relatively rapid rate, which slows down in the middle of the attenuation response curve and increases at towards the maximum. In principle, a corresponding cam would have approximately the same shape as the response curve, thereby providing an air gap adjusting mechanism that varies with each turn in the manner indicated in FIG. 7B to achieve a linear relationship between the attenuation and turning of the actuator.

In practice, however, the attenuation data must be adjusted to account for the delay in separation of the air gap due to the connector springs that maintain contact between the two terminations. Furthermore, the attenuation data must be normalized so that, at the point where the air gap starts to separate, the attenuation is zero, and finally the data must be collected for the multiple wavelengths that must be carried in any bi-directional transmission cable.

Normalization of the response data may be accomplished, as illustrated in FIG. 8, by defining a line a+bz through the two points $(z_3, A_3)$ and $(z_4, A_4)$ where the attenuation is just starting to change, calculating the slope $b=(A_4-A_3)/(z_4-z_4)$ and $a=A_4-bz_4$, and then calculating the intersection point $z_0, A_0$ by calculating $z_0(A_0-a/b$ where $A_0=A_1=A_2$. The starting point $z_0$ can then be subtracted from each raw z in the data to obtain a table or graph of adjusted response data.

Figure 11:
FIG. 11 is a table converting the data represented by the graph shown in FIG. 10 into cutting parameters for an exemplary cam surface.

A typical bi-directional fiber optic transmission cable carries light at wavelengths of 1310 nm and 1550 nm and, therefore, in order to provide a practical attenuator, response curves must be generated for both wavelengths. An example of a graph of the normalized mean attenuation values for 1550 nm and 1310 nm is found in FIG. 9. The mean of the two separate response curves illustrated in FIG. 9 is then used to design the surface of the cam, for example by employing a curve fitting program such as TableCurve 2D™, ver. 3, to generate a function that matches the data shown in the graph, as illustrated in FIG. 10. The curve of FIG. 10 can then be converted into a table of values expressed in terms of cam angle and drops or cuts, as illustrated in FIG. 11 (which uses slightly different curve fit data than the graph of FIG. 10). Theta in FIG. 11 is the cam surface angle relative to the z=0 reference line shown in FIGS. 14 and 15.

The data in FIGS. 9–11 does not take into account the radius of curvature of the cam followers, whose effect is illustrated in FIG. 12. In a practical application of the preferred embodiment of the invention, it will generally be necessary to further adjust the response data curve using simple trigonometry to convert points (x,y) representing the cam surface derived form the response curves to points (x',y') representing the actual cam surface necessary to compensate for the effect of the radius of curvature of the cam followers, which are in the form of radiused pins.

Figures 13, 14:
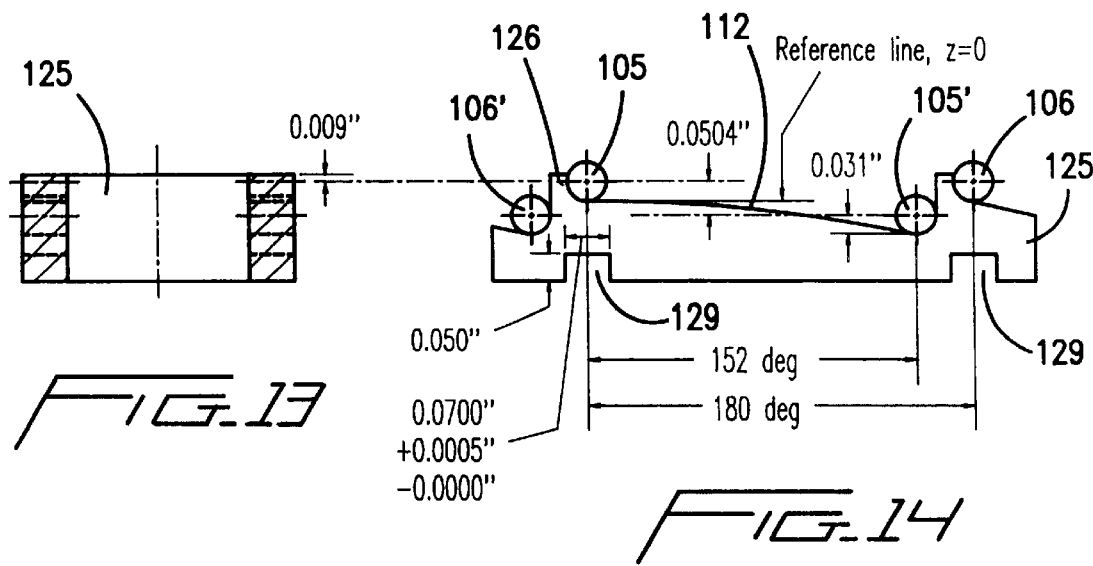

The rotary cam piece 125 illustrated in FIGS. 13 and 14 has a shape determined by the table of FIG. 11. FIG. 13 is a cross-section of the cam, with dashed lines corresponding to points on the projection shown in FIG. 14. The projection shown in FIG. 14 covers slightly more than a 180° section of the cam surface. As the cam is rotated over a distance of 152° from point A to point B, the cam followers 105, 106 will move from the z=0 reference line a distance of 0.0504 inches, to the position indicated by reference numerals 105',106'. Further rotation of the cam piece is prevented by stop 126, while over-rotation in the opposite direction is prevented by stop 127.

Figure 15:
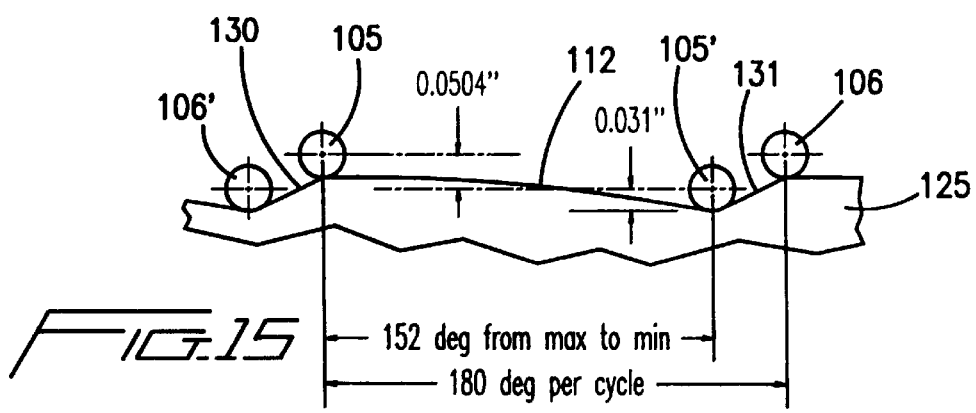
FIG. 15 is a projection of a preferred modification of the cam surface of FIGS. 13 and 14.

In a preferred modification of the cam surface illustrated in FIGS. 13 and 14, as shown in FIG. 15, the pin stops 126 and 127 are removed and replaced by ramps 130 and 131 to allow the cam followers 105,106 to move beyond the range of 0 to 152° and reset. This prevents the variable attenuator from being damaged by adjusting the actuator too far beyond its endpoints, causing the stops 126 and 127 to apply torque to the cam followers. In the illustrated example of a 10:1 turn ratio, the ramps permit the cam pins to move about 1.5 turns of the screw drive from minimum attenuation to maximum attenuation and back so that input turns can be made without restriction, the attenuator simply resetting itself without any damage as the cam is turned passed the minimum or maximum points at the ends of the ramps.

Although the cam surfaces shown in FIGS. 13–15 are illustrated as including two identical sections arranged to cooperate with two cam followers, those skilled in the art will appreciate that the cam could include any number of sections, including one, three, four, or more sections, all connected by pin stops of ramps, with one cam follower is included for each section.

Having thus described a preferred embodiment of the invention with sufficient particularity to enable those skilled in the art to easily make and use the invention, and having described several possible variations and modifications of the preferred embodiment, it should nevertheless be appreciated that still further variations and modifications of the invention are possible, and that all such variations and modifications should be considered to be within the scope of the invention. Accordingly, the scope of the invention should not be limited by the above description, but rather should be interpreted solely in accordance with the appended claims.

What is claimed is:

1. A variable attenuator having a linear response, comprising:
    a housing;
    a coupler for coupling a first fiber optic cable to the housing;
    a slide body slidably fitted in the housing and arranged to receive a second fiber optic cable;
    a cam arrangement including a cam member, a cam surface and a spring arranged to cause the slide body to move relative to the housing in a direction parallel to an axis of the second fiber optic cable in response to rotation of the cam member, said second fiber optic cable being moved together with the slide body, wherein ends of fibers in the first and second fiber optic cables face either other and an air gap is formed between the fiber ends as the slide body moves the second fiber optic cable relative to the housing, movement of the slide body in response to rotation of the cam member and the back force of the spring causing the length of said air gap to vary and variation in said air gap length causing variation in attenuation of light passing through the air gap, and wherein said cam surface is configured such that a change in said attenuation is proportional to an angle through which said cam member is rotated to vary the air gap length and is substantially linear with rotation of said cam member.

2. An attenuator as claimed in claim 1, wherein said slide body is arranged to support at least one cam follower, at least an end of said cam member is cylindrical in shape and said cam surface is arranged to face said slide body, and wherein said cam follower engages said cam surface to move said slide body in response to rotation of said cam member.

3. An attenuator as claimed in claim 2, wherein said cam follower is a pin that floats on the cam surface.

4. An attenuator as claimed in claim 2, wherein said at least one cam follower includes two cam followers, said cam surface including two identical sections, each extending 180° around said cam surface.

5. An attenuator as claimed in claim 4, wherein said two identical sections are separated by stops that prevent the two cam followers from crossing from one section to another.

6. An attenuator as claimed in claim 4, wherein said two identical sections are separated by ramps that permit the cam followers, upon reaching an end of a section and therefore causing the slide body to move to a limit of its travel, to move to the beginning of a next section, resetting the slide body to a beginning of its travel, thereby permitting the actuator to be turned beyond its limits without damaging the cam body or slide body.

7. An attenuator as claimed in claim 2, further comprising a worm and worm gear for causing rotation of the cam body.

8. An attenuator as claimed in claim 7, wherein said worm and worm gear includes a worm gear coaxial and rotatable with said cam body, and a worm in engagement with said worm gear.

9. An attenuator as claimed in claim 8, wherein said worm is fixed to a shaft having at its end a manually driven actuator.

10. An attenuator as claimed in claim 9, wherein said actuator is a slotted shaft head.

11. An attenuator as claimed in claim 8, wherein said worm gear is sandwiched between a shoulder on the cam member and a worm gear plate removably attached to said housing, removal of said worm gear plate providing access to said worm gear, cam member, and slide body.

12. An attenuator as claimed in claim 8, wherein said worm is fixed to a shaft supported by end plates removably attached to said housing, removal of said end plates providing access to said worm.

13. An attenuator as claimed in claim 8, wherein said worm is coupled to a manual actuator, and said worm and worm gear are arranged to provide a turn ratio of multiple turns of the actuator for a single rotation of the cam member.

14. An attenuator as claimed in claim 1, wherein said housing includes a removable front housing, said removable front housing including an adapter arranged to be coupled to a fiber optic coupler to which the first fiber optic transmission cable is terminated.

15. An attenuator as claimed in claim 1, wherein the cam surface is an end surface of a cylindrical cam piece secured to the cam member and configured to fit a curve representing attenuation-to-gap-length data.

\* \* \* \* \*

UNITED STATES PATENT AND TRADEMARK OFFICE
CERTIFICATE OF CORRECTION

PATENT NO. : 6,256,446 B1
DATED : July 3, 2001
INVENTOR(S) : Brunsting et al.

It is certified that error appears in the above-identified patent and that said Letters Patent is hereby corrected as shown below:

Column 1,
Line 33, change "in" to -- is --.

Column 7,
Line 25, delete "at".
Line 45, change "$z_o(A_o-a/b$" to -- $z_o(A_o-a)/b$ --.

Column 8,
Line 40, delete "is".

Signed and Sealed this

Twenty-seventh Day of January, 2004

JON W. DUDAS
*Acting Director of the United States Patent and Trademark Office*